United States Patent
Reichenbach et al.

(10) Patent No.: US 8,154,232 B2
(45) Date of Patent: Apr. 10, 2012

(54) METHOD FOR OPERATING A MOTOR SYSTEM, AND A MOTOR SYSTEM

(75) Inventors: Norbert Reichenbach, Amberg (DE); Johann Seitz, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 500 days.

(21) Appl. No.: 12/310,684

(22) PCT Filed: Aug. 20, 2007

(86) PCT No.: PCT/EP2007/058629
§ 371 (c)(1),
(2), (4) Date: Mar. 4, 2009

(87) PCT Pub. No.: WO2008/028798
PCT Pub. Date: Mar. 13, 2008

(65) Prior Publication Data
US 2010/0045223 A1    Feb. 25, 2010

(30) Foreign Application Priority Data
Sep. 6, 2006  (DE) .......................... 10 2006 041 864

(51) Int. Cl.
*H02P 1/04* (2006.01)
(52) U.S. Cl. .................... 318/400.09; 318/379; 318/261

(58) Field of Classification Search ............. 318/400.09, 318/379, 261, 368, 568.11, 567, 442
See application file for complete search history.

(56) References Cited

U.S. PATENT DOCUMENTS
| | | | |
|---|---|---|---|
| 4,153,554 A * | 5/1979 | von der Heide et al. | 210/96.2 |
| 4,577,604 A  | 3/1986 | Hara et al. | |
| 5,528,115 A * | 6/1996 | Taguchi | 318/379 |

FOREIGN PATENT DOCUMENTS
| | | |
|---|---|---|
| DE | 25 00 911 | 7/1976 |
| DE | 35 26 598 | 2/1987 |
| DE | 92 04 107 | 7/1992 |
| DE | 197 01 856 | 7/1998 |
| JP | 61-9179 | 1/1986 |
| JP | 61-142981 | 6/1986 |
| WO | WO 2006/034977 | 4/2006 |

* cited by examiner

*Primary Examiner* — Karen Masih
(74) *Attorney, Agent, or Firm* — Harness, Dickey & Pierce, P.L.C.

(57) ABSTRACT

In order to enable in a motor system, in which a soft start of the motor has been implemented, the operation of the motor, wherein the power consumption is reduced, it is proposed to operate the driver circuit during a switch-on phase in order to carry out a soft start of the motor. In at least one embodiment, the driver circuit can be bypassed in a normal operational phase as a function of a load, by means of which the motor is operated.

17 Claims, 3 Drawing Sheets

US 8,154,232 B2

METHOD FOR OPERATING A MOTOR SYSTEM, AND A MOTOR SYSTEM

PRIORITY STATEMENT

This application is the national phase under 35 U.S.C. §371 of PCT International Application No. PCT/EP2007/058629 which has an International filing date of Aug. 20, 2007, which designated the United States of America and which claims priority on German application number DE 10 2006 041 864.6 filed Sep. 6, 2006, the entire contents of each of which are hereby incorporated herein by reference.

FIELD OF THE INVENTION

At least one embodiment of the invention generally relates to a method for operation of a motor system having a driver circuit and a motor, and/or to a motor system such as this as well.

BACKGROUND

Depending on the field of use, motor systems are now provided with units which allow soft starting of the motor, in order to avoid jerky starting of the motor, for example when the maximum operating voltage is applied immediately. For this purpose, the motor is normally provided with a driver circuit which is driven by a control unit in a suitable manner, for example by way of phase-gating control, in order to ensure that the voltage which is supplied to the motor rises slowly during a switching-on phase. The driver circuit normally has power semiconductors which absorb a portion of the power provided to the motor, and convert this to heat losses.

In order to reduce the power loss in the driver circuit, the driver circuit is bridged after the switching-on phase, that is to say on reaching the maximum motor drive level, as a result of which the power loss in the driver circuit, that is to say in its power semiconductors, is suppressed. This considerably reduces the power loss during continuous operation, in particular at the rated motor load, thus making it easier to provide air-conditioning for the switchgear cabinet. Furthermore, this makes it possible to dispense with physically large cooling elements, thus allowing a compact device design.

When the driver circuit is bridged, the motor is normally driven with the maximum available voltage. When the motor is being operated in a partial load range, that is to say in a range in which the load applied to the motor is less than a rated load, the laws of physics mean that the current which is drawn by the motor does not decrease to the same extent. However, this results in higher heat losses than necessary in the motor, as a result of which more energy is required to operate the motor than is necessary. When the motor in motor systems in which it is not possible to bridge the driver circuit is operated in the rated load range, high losses generally occur in the power semiconductors in the driver circuit.

The document U.S. Pat. No. 4,577,604 discloses a control system for a fuel pump, in which the operating speed of the fuel pump is controlled in order to control the fuel pressure in a fuel supply system in an internal combustion engine. The control system comprises a main control circuit, which permanently connects a driver circuit to an electrical power supply, and an auxiliary circuit which is opened during normal operation. The main control circuit matches the electrical power supply to the driver circuit, in order to match the operating speed of the fuel pump either to a first maximum speed or to a second minimum speed. The auxiliary circuit establishes an electrical connection between the driver circuit and the electrical power supply when an increase in the fuel pressure in the supply line is demanded, and the air-fuel ratio is therefore detected as being above a predetermined value on the basis of previously selected operating parameters.

SUMMARY

At least one embodiment One object of the present invention allows the motor in a motor system in which soft starting is provided for the motor to be operated in a manner in which the power consumption of the motor is reduced.

According to a first aspect of an embodiment of the present invention, a method is provided for operation of a motor system having a driver circuit and a motor. The driver circuit is operated during a switching-on phase, in order to carry out soft starting of the motor. In a normal operating phase, the driver circuit can be bridged. In this case, the driver circuit is bridged in the normal operating phase as a function of a load at which the motor is being operated.

This allows a motor system with a soft starting option to be operated in a power saving mode in that, in the normal operating phase, the motor is not driven independently of the applied load, as would be the case if the driver circuit were to be bridged unconditionally after the switching-on phase. Instead of this, the bridging of the driver circuit is carried out as a function of the load which is applied to the motor.

The load at which the motor is being operated is preferably detected by measurement of a current through the motor. The current measurement makes it possible to determine the power consumption of the motor, which is in turn related to the load which is applied to the motor.

Particularly when the load at which the motor is being operated is greater than a threshold load value, the driver circuit is bridged. In this case, when the load at which the motor is being operated is less than the threshold load value, the driver circuit is preferably not bridged and the driver circuit is operated such that the motor is driven in the phase-gating mode. In this mode, the motor is supplied with only as much power as is required to operate the motor on the partial load. Furthermore, the power is preferably adjusted as a function of the load at which the motor is being operated (power saving mode).

An embodiment of the invention provides for the driver circuit still to be bridged during the normal operating phase, as a function of a temperature in the driver circuit. This makes it possible to ensure that the driver circuit, which is generally designed only for low loads in the case of a motor system with a soft starting mode, to be protected against overheating in the energy saving mode.

According to a further aspect of an embodiment of the present invention, a motor system is provided with a motor, a driver circuit for driving the motor, and a control unit which is connected to the driver circuit in order to drive the driver circuit during a switching-on phase such that soft starting of the motor is carried out. A bridging circuit is also provided, by means of which the driver circuit can be bridged in a normal operating phase, wherein, in the normal operating phase, the control unit uses the bridging circuit to bridge the driver circuit as a function of a load at which the motor is being operated.

A detection circuit is preferably provided in order to detect the load at which the motor is being operated, by measurement of a current through the motor.

According to one embodiment of the invention, the control unit bridges the driver circuit when the detection circuit finds that the load at which the motor is being operated is greater than a threshold load value.

Furthermore, when the detection circuit finds that the load at which the motor is being operated is less than the threshold load value, the control unit can drive the driver circuit in order to operate the motor in a phase-gating mode.

Furthermore, the control unit can operate the driver circuit such that the power is adjusted as a function of the load at which the motor is being operated (energy saving mode).

According to one embodiment of the invention, the control unit can drive the bridging circuit in the normal operating phase such that the driver circuit is bridged as a function of a temperature in the driver circuit.

BRIEF DESCRIPTION OF THE DRAWINGS

Example embodiments of the invention will be explained in more detail in the following text with reference to the attached drawings, in which.

DETAILED DESCRIPTION OF THE EXAMPLE EMBODIMENTS

Figure 1:
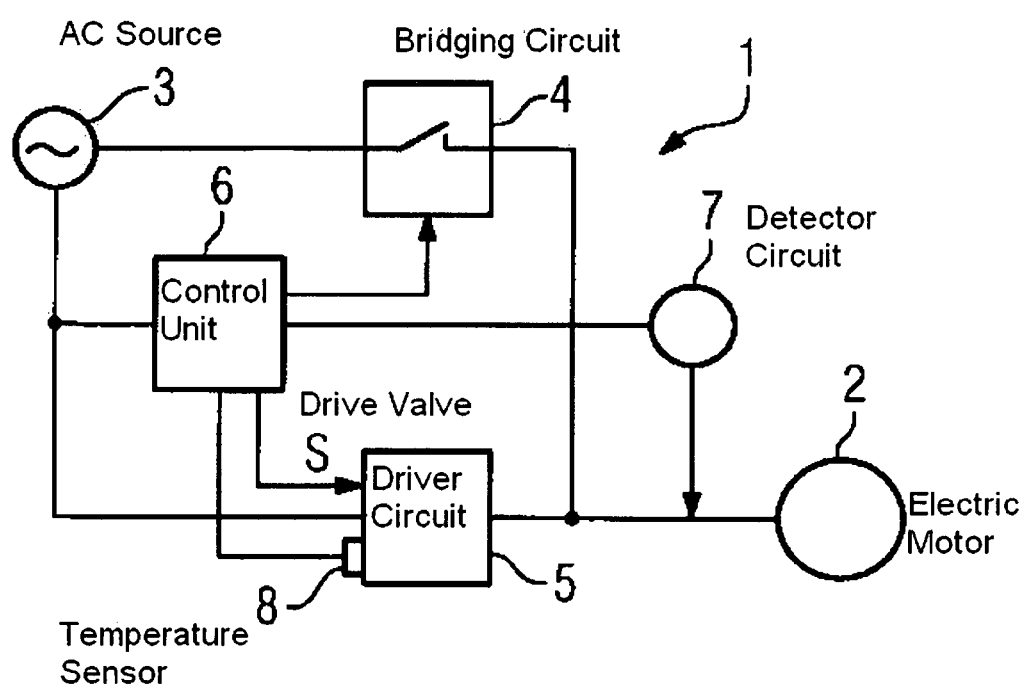
FIG. 1 shows a block diagram of a motor system according to an embodiment of the invention.

FIG. 1 shows a block diagram of a motor system 1 which has an electric motor 2, for example an asynchronous motor or some other brushless motor. The motor 2 in the illustrated example embodiment is operated with the aid of an alternating-current source 3 and can be connected directly thereto via a bridging circuit 4 which, for example, is in the form of a switch, or via a driver circuit 5, which modifies the alternating current from the alternating-current source 3, for example by means of phase-gating control, as a function of a drive value S that is provided, in order to apply partial power to the motor 2.

The drive variable S is provided by a control unit 6. The control unit 6 is also connected to the bridging circuit 4 in order to switch this such that it bridges or does not bridge the driver circuit 5. Furthermore, the control unit 6 can be connected to a detector circuit 7 which measures a current in the motor 2 in order to determine the load on the motor 2 from this. Furthermore, a temperature sensor 8 can optionally be provided, which is arranged on the driver circuit 5 in order to detect the temperature of the driver circuit 5 and in particular to find out whether a specific temperature threshold value is being exceeded. The temperature and/or the exceeding of the temperature threshold value are/is indicated on the control unit 6.

Figure 2:
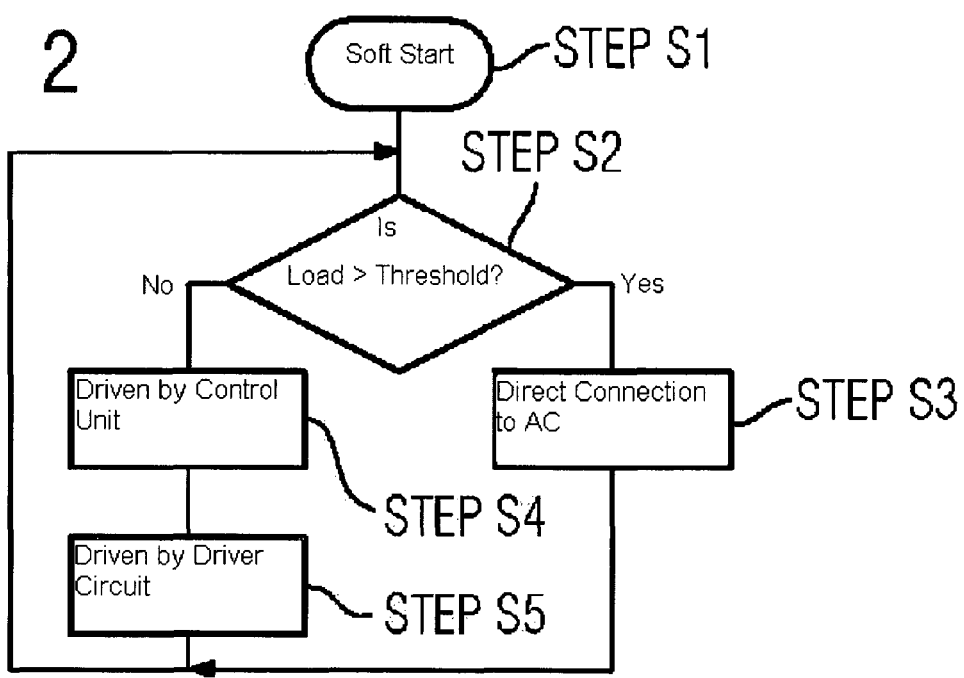
FIG. 2 shows a flowchart in order to illustrate the method for operation of a motor system in a further embodiment of the invention.

FIG. 2 shows a flowchart in order to illustrate the method for operation of the motor system 1 according to an embodiment of the invention. Once the motor system has been switched on, or after signaling that the motor 2 is intended to be started, the motor is driven with a rising power level in accordance with a soft-starting program, in such a way that the motor starts without jerking (step S1). Then, that is to say after the end of the switching-on phase, a check is carried out in a step S2 to determine whether the load at which the motor 2 is being operated is greater than a threshold load value. In this case, the detector circuit 7 is first of all used to determine the load on the motor 2. If the load on the motor 2 is greater than the threshold load value (step S2), the control unit 6 drives the bridging circuit 4 such that the motor 2 is connected directly via the closed switch in the bridging circuit to the alternating-current source 3, and the driver circuit 5 is thus bridged.

If the load at which the motor is being operated is less than the threshold load value, then, in step S4, the bridging circuit 4 is driven by the control unit 6 such that the direct connection between the alternating-current source 3 and the motor 2 is broken, and the motor 2 is now driven via the driver circuit 5 (step S5). The control unit 6 drives the driver circuit 5 as a function of the load, as determined in step S2, on the motor 2, such that the motor 2 is provided only with an amount of power which is sufficient for operation of the load which is applied to the motor 2.

For example, the driver circuit 5 can carry out phase-gating control of the alternating current provided by the alternating-current source 3, as a function of the drive variable S, which is determined by the control unit 6 on the basis of the detected current through the motor 2. The phase-gating control means that the effective voltage which is applied to the motor 2 is reduced such that the power consumption of the motor 2 which, as has been stated above, is being operated only on a partial load, is less than in the case of a bridged driver circuit 5, in which case the motor is operated with a maximum voltage provided by the alternating-current source.

Figure 3:
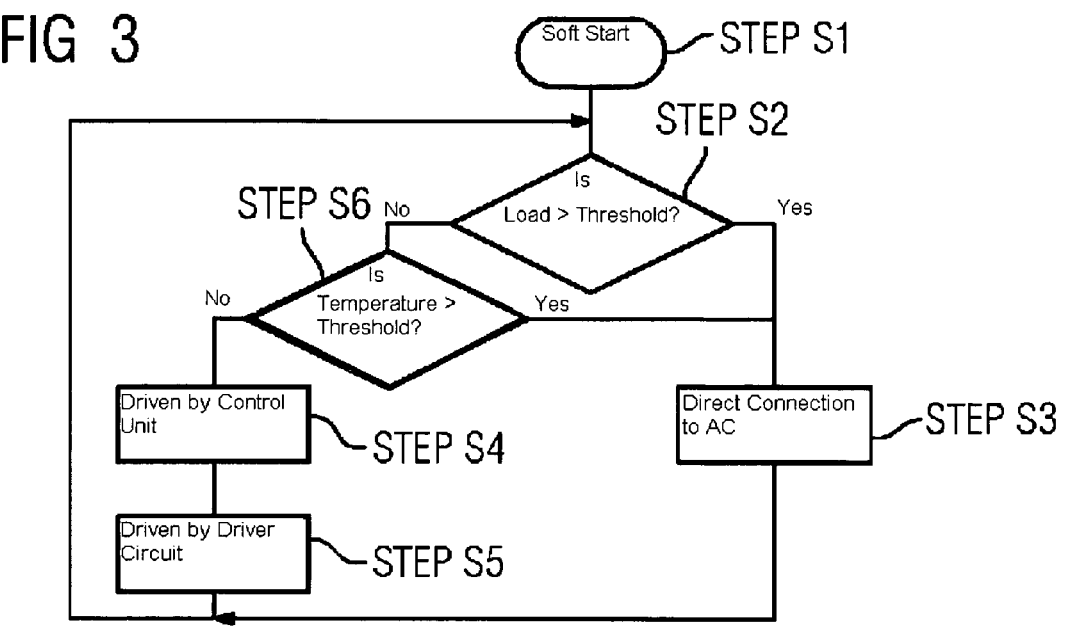
FIG. 3 shows a flowchart of a method for operation of a motor system according to a further embodiment of the invention.

FIG. 3 shows a further option for a method for operation of a motor system according to an embodiment of the invention. Identical steps in the method are provided with the same reference symbols as in FIG. 2. The method in FIG. 3 differs essentially in that, after step S2, when the load at which the motor is being operated is less than the threshold load value, a check is first of all carried out in a step S6 to determine whether the power semiconductors in the driver circuit 5 are at a higher temperature than the temperature threshold value. This can be detected by the temperature detector 8 which indicates either the temperature of the driver circuit 5 and transmits this to the control unit 6, or finds that the temperature threshold value has been exceeded, and signals this overshooting to the control unit 6.

If it is found that the temperature threshold value has been exceeded, the method carries out step S3 as the next step, in which the bridging circuit 4 is driven in order to bridge the driver circuit 5. In consequence, the motor 2 is connected directly to the alternating-current source 3 and the drive to the driver circuit 5 is suppressed, and is preferably carried out in such a way that the power semiconductors in the driver circuit 5 are in a switched-off state.

If the temperature of the driver circuit 5 has not exceeded the temperature threshold value, then step S4 is carried out in the next step, in which the bridging circuit 4 is deactivated (opened), provided that it has not yet been deactivated, and the driver circuit 5 is driven corresponding to the step S5 as described above, in order to operate the motor 2 such that it is optimally matched in the partial load range to the load (determined in step S2) applied to the motor 2.

The checks in step S2 and step S6 are carried out repeatedly, as a result of which the control unit 6 can also decide at any time during operation to change between the energy-saving mode, in which the motor 2 is operated with a partial load after the switching-on phase and is driven by the driver circuit 5, and a bridging mode, in which the motor 2 is supplied directly by the alternating-current source 3.

The method according to an embodiment of the invention relates in particular to motor systems in which the driver circuit 5 is designed to ensure only soft starting of the motor. Soft starting such as this is carried out only briefly during a switching-on phase of the motor 2, that is to say that the driver circuit is of minimal dimensions corresponding to this requirement, and is not intended for continuous operation of the motor 2, since either the power semiconductors are designed to be too weak or no suitable heat dissipation is provided. For this reason in particular, the threshold load value must be chosen such that operation of the motor 2 in a partial load range does not lead to overloading of the driver circuit 5 which, particularly in the case of the method as shown in FIG. 3, would lead to frequent switching backward and forward between the bridging mode and the energy saving mode, as a result of the temperature threshold value being exceeded.

An energy saving mode is particularly worthwhile when the motor is operated on partial load (for example <60% of the motor rated power). The motor rated power is the maximum power at which the motor can be reliably operated over an unlimited time period. In order to reduce even further the number of these switching processes between the energy saving mode and the bridging mode, the threshold load value can also be chosen such that the energy saving mode is used only when the load on the motor leads to a current through the motor which is 20%-40% of the rated current (which is dependent on the rated power) of the motor.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for operation of a motor system including a driver circuit and a motor, the method comprising:
   operating the driver circuit during a switching-on phase in order to carry out soft starting of the motor; and
   bridging the driver circuit in a normal operating phase as a function of a load at which the motor is being operated, wherein during the normal operating phase, the driver circuit is still bridged as a function of a temperature in the driver circuit.

2. The method as claimed in claim 1, wherein the load at which the motor is being operated is detected by measurement of a current through the motor.

3. The method as claimed in claim 1, wherein the driver circuit is bridged when the load at which the motor is being operated is greater than a threshold load value.

4. The method as claimed in claim 3, wherein, when the load at which the motor is being operated is less than the threshold load value, the driver circuit is not bridged, and the driver circuit is operated in a phase-gating mode.

5. The method as claimed in claim 4, wherein the power is set as a function of the load at which the motor is being operated.

6. The method as claimed in claim 1, wherein the driver circuit is bridged when the temperature exceeds a threshold temperature.

7. A motor system comprising:
   a motor;
   a driver circuit to drive the motor;
   a control unit, operatively connected to the driver circuit to control the driver circuit during a switching-on phase to carry out soft starting of the motor; and
   a bridging circuit, by which, in a normal operating phase, the driver circuit is bridged as a function of a load at which the motor is being operated, wherein the control unit drives the bridging circuit in the normal operating phase such that the driver circuit is bridged as a function of a temperature in the driver circuit.

8. The motor system as claimed in claim 7, further comprising:
   a detection circuit to detect the load at which the motor is being operated, by measurement of a current through the motor.

9. The motor system as claimed in claim 7, wherein, when the detection circuit finds that the load at which the motor is being operated is greater than a threshold load value, the control unit drives the bridging circuit such that the driver circuit is bridged.

10. The motor system as claimed in claim 9, wherein, when the detection circuit finds that the load at which the motor is being operated is less than the threshold load value, the control unit drives the driver circuit in order to operate the motor in a phase-gating mode.

11. The motor system as claimed in claim 10, wherein the control unit operates the driver circuit such that the power is adjusted as a function of the load at which the motor is being operated.

12. The motor system as claimed in claim 7, further comprising:
   a temperature detector, operatively connected to the control unit, to bridge the driver circuit with the aid of the bridging circuit when the temperature exceeds a threshold temperature.

13. The method as claimed in claim 2, wherein the driver circuit is bridged when the load at which the motor is being operated is greater than a threshold load value.

14. The motor system as claimed in claim 8, wherein, when the detection circuit finds that the load at which the motor is being operated is greater than a threshold load value, the control unit drives the bridging circuit such that the driver circuit is bridged.

15. The motor system as claimed in claim 14, wherein, when the detection circuit finds that the load at which the motor is being operated is less than the threshold load value, the control unit drives the driver circuit in order to operate the motor in a phase-gating mode.

16. The motor system as claimed in claim 15, wherein the control unit operates the driver circuit such that the power is adjusted as a function of the load at which the motor is being operated.

17. The method as claimed in claim 1, wherein the motor is electric.

* * * * *